United States Patent [19]

Nishiyama

[11] 4,061,208

[45] Dec. 6, 1977

[54] PAD-WEAR COMPENSATING DEVICE FOR DISC BRAKE

[75] Inventor: Yukinori Nishiyama, Hyogo, Japan

[73] Assignee: Sumitomo Electric Industries, Ltd., Osaka, Japan

[21] Appl. No.: 748,443

[22] Filed: Dec. 8, 1976

[30] Foreign Application Priority Data

Dec. 17, 1975 Japan .................................. 50-150928

[51] Int. Cl.² ............................................. F16D 65/56
[52] U.S. Cl. ............................ 188/71.9; 188/196 BA
[58] Field of Search ................ 188/71.8, 71.9, 79.5 K, 188/196 B, 196 BA

[56] References Cited

U.S. PATENT DOCUMENTS 3,211,263 10/1965 Harrison .......................... 188/71.9 X

*Primary Examiner*—Duane A. Reger
*Attorney, Agent, or Firm*—Sughrue, Rothwell, Mion, Zinn and Macpeak

[57] ABSTRACT

A disc brake assembly includes a yoke or caliper 9 mounting fixed and movable pads 12, 5 on opposite sides of a wheel disc 1. A push rod 2 is threaded through a cam nut 3, and is axially screwed into engagement with the movable pad 5 by the rotation of the cam nut. The latter is turned by and within a lever ring 21 via spring biased jamming balls or rollers 22 disposed in wedge-shaped recesses between the cam nut and the lever ring. The push rod is advanced toward the movable pad 5 to compensate for the wear thereof by the gradual rotation of the cam nut via a one-way clutch within which the cam nut may undergo limited rotation during brake operation. The one-way action of the clutch may be implemented by a jam ball arrangement, or by a ratchet wheel and pawl arrangement.

7 Claims, 9 Drawing Figures

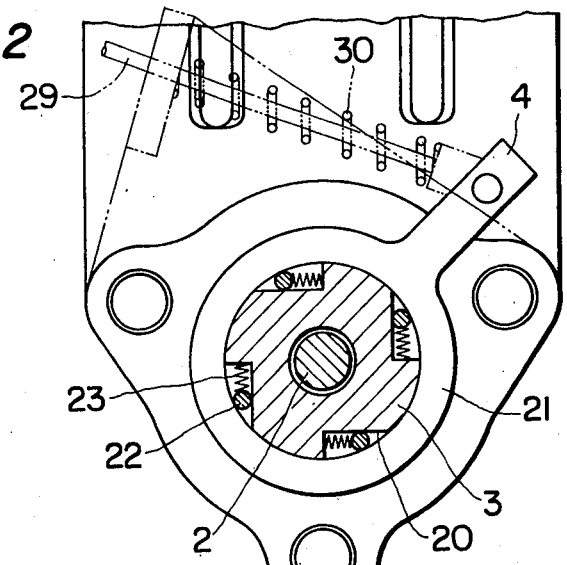
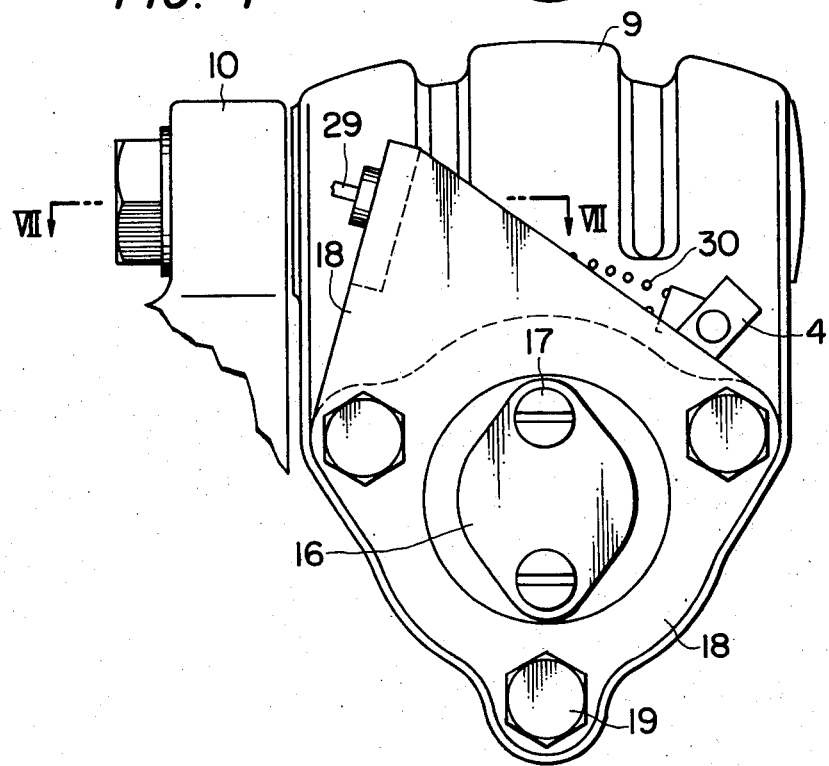

PAD-WEAR COMPENSATING DEVICE FOR DISC BRAKE

BACKGROUND OF THE INVENTION

Field of the Invention

This invention relates to a pad-wear compensating mechanism for a disc brake, particularly a bicycle or motorcycle brake.

SUMMARY OF THE INVENTION

Briefly, and in accordance with the present invention, a disc brake assembly includes a yoke or caliper mounting fixed and movable pads on opposite sides of a wheel disc. A push rod is threaded through a cam nut, and is axially screwed into engagement with the movable pad by the rotation of the cam nut. The latter is turned by and within a lever ring via spring biased jamming balls or rollers disposed in wedge-shaped recesses between the cam nut and the lever ring. The push rod is advanced toward the movable pad to compensate for the wear thereof by the gradual rotation of the cam nut via a one-way clutch within which the cam nut may undergo limited rotation during brake operation. The one-way action of the clutch may be implemented by a jam ball arrangement, or by a ratchet wheel and pawl arrangement.

BRIEF DESCRIPTION OF THE DRAWINGS

In the drawings:

FIG. 2 is a cross-sectional view taken along lines II—II of FIG. 1;

FIG. 4 is a side view, as seen from the left side of FIG. 1;

DESCRIPTION OF THE PREFERRED EMBODIMENTS

Figure 1:
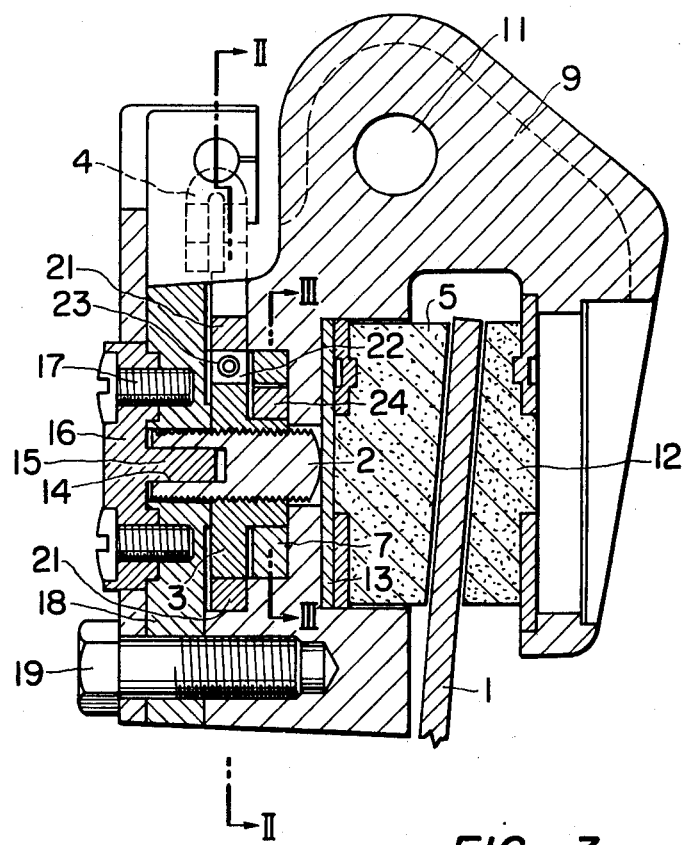
FIG. 1 is an axial cross-sectional view of a pad wear compensating mechanism for a disc brake assembly according to the present invention.

Considering, in general, FIGS. 1–7, caliper 9 straddles a disc 1 and is journaled on a shaft 11 in a rocking relation relative to a stationary member 10 secured to a vehicle frame, not shown. The shaft 11 extends perpendicular to the axis of a brake disc 1.

A pad-wear compensating device according to the present invention is formed on one arm of the caliper 9. Secured to the other arm of the caliper is a pad 12 disposed oppsite a pad 5. In the operation of the pad-wear compensating device to be described in more detail hereinafter, the pads are frictionally urged against the surface of the disc, so that the caliper swings about the shaft 11 according to a reaction thereof, and thus the pad 12 is urged against the other friction surface of the disc. The braking torque absorbed by the pads 5, 12 is transmitted through the stationary member 10 to the rigid vehicle frame.

A description will now be given in more detail of the construction of the pad-wear compensating device according to the prsent invention.

As shown in FIG. 1, a projection on a push rod 2 engages a plate 13 secured to the other side of the pad 5 with respect to the disc. The outer surface of the push rod is threaded, and a cam nut 3 is maintained in threading engagement with the threaded surface of the push rod 2. A groove 14 is provided in the other end of the push rod 2 and extends in the axial direction of the disc. A square tongue 15 extending in the axial direction of the disc is slidingly fitted in the groove 14. A cap 16 integral with the tongue 15 is secured to a cover 18 by bolts 17. The cover 18 is secured to one arm of the caliper 9 by bolts 19.

Figure 3:
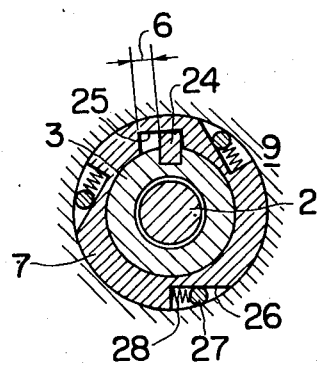
FIG. 3 is a cross-sectional view taken along lines III—III of FIG. 1.
Figure 5:
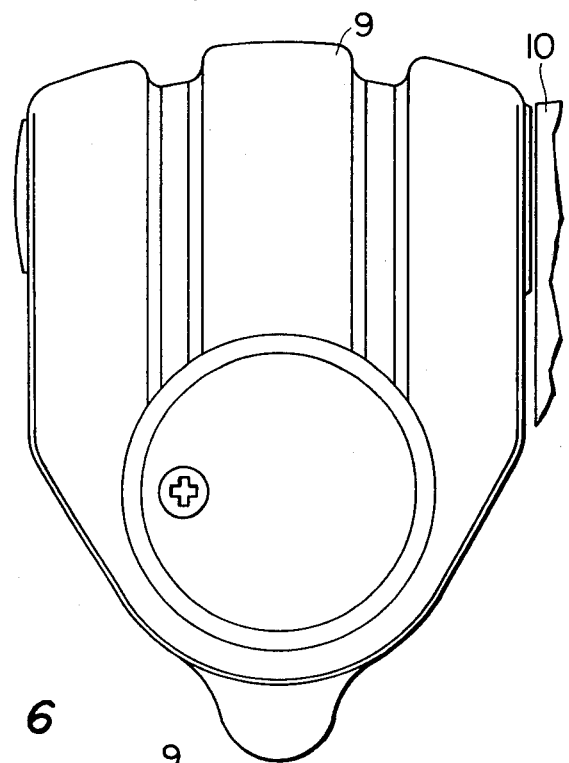
FIG. 5 is a side view as seen from the right side of FIG. 1.
Figure 6:
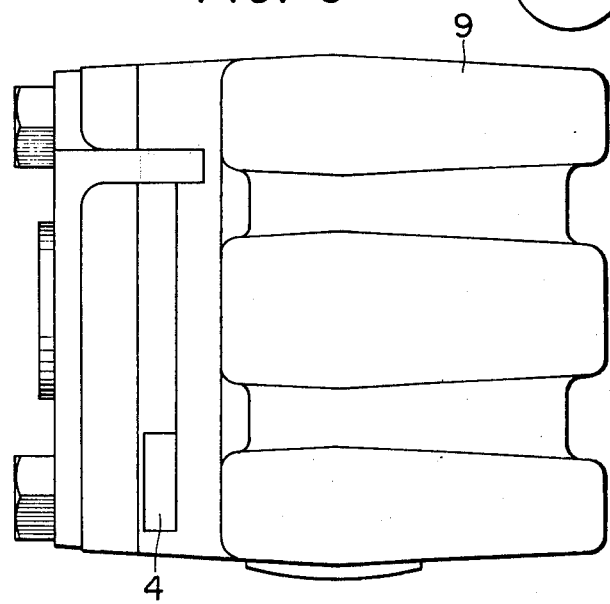
FIG. 6 is a plan view as seen from the top of FIG. 1.
Figure 7:
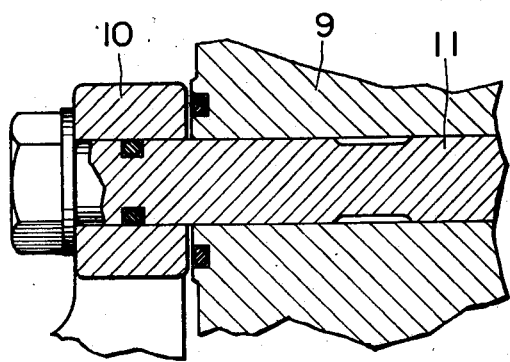
FIG. 7 is a partial cross-sectional view taken along lines VII—VII of FIG. 4.

As shown in FIG. 2, the cam nut 3 is formed with four wedge-shaped cuts or grooves 20 along the periphery of the nut 3, so that wedge-shaped spaces are defined between the cam nut 3 and a lever ring 21 slidingly fitted on the periphery of the cam nut 3. The lever ring 21 is formed with a lever 4. Positioned in each of the wedge-shaped spaces is a roller 22 and a spring 23 which urges the roller 22 towards the narrow end of each space. The cam nut 3 is ring shaped in cross section, and has a keyway therein as shown in FIG. 3. A central extension on the cam nut 3 protrudes to the right as shown in FIG. 1

A key 24 is fitted in the keyway and protrudes into a keyway 25 in the inner peripheral surface of a cam 7, with a space 6 left between the widened inner surface of the keyway 25 and the key 24. In addition, three wedge-shaped grooves 26 are defined in the outer periphery of the cam 7, thereby forming wedge-shaped spaces between a cylindrical recess in the caliper 9 and the outer periphery of the cam 7. Positioned in each of the wedge-shaped spaces is a roller 27 and a spring 28 which urges the roller 27 towards the narrow end of each space.

In operation, when a brake cable 29, shown in chain line, is pulled to the left and the lever 4 is rotated in a counter-clockwise direction against the force of a spring 30 disposed between an end wall of the cover 18 and the lever 4, the cam nut 3 is rotated in a counter-clockwise direction through the jaming action of the rollers 22. As a result, the push rod 2 is moved or screwed to the right in FIG. 1, because of its threaded outer surface, thereby squeezing the disc 1 between the pads 5, 12 and exerting a braking force. When the brake cable 29 is released, the lever 4 rotates in a clockwise direction under the action of the spring 30 to return to its original position, whereupon the cam nut 3 also rotates in a clockwise direction due to the force exerted by the springs 23 between the lever ring 21 and the cam nut 3. As a result, the push rod 2 is returned to the left in FIG. 1, to restore a clearance between the pad 5 and the disc 1.

The pads 5, 12 are subject to frictional wear during service, thereby reducing their thicknesses. In this connection, the push rod 2 should advance a distance corresponding to the sum of the amount of wear of both pads. This dictates the use of a compensating mechanism. When the pads become worn so that the clearance between the pads and the disc exceeds a given value, then the key 24 fitted in the cam nut 3 will rotate in a counter-clockwise direction upon a braking operation to the extent permitted by the width of the space 6, thereby rotating the cam 7 in a counter-clockwise direction. That is, ring 21 and cam nut 3 rotate sufficiently to bring the key 24 against the wall of keyway 25, thereby rotating cam 7.

Figure 8:
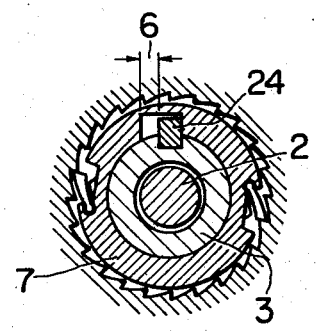
FIG. 8 is an illustrative view of another embodiment of the invention.
Figure 9:
FIG. 9 is a partialy enlarged view of the embodiment shown in FIG. 8

The arrangement of cam 7, roller 27, spring 28 and caliper 9 is that of one-way clutch, sometimes referred to as a "free wheel". That is, the cam 7 in FIG. 3 may rotate in a counter-clockwise direction, but cannot rotate in a clockwise direction due to the jamming or wedging action of the spring biased rollers 27. As shown in FIGS. 8 and 9, a ratchet wheel and spring pawl arrangement may be used in place of the arrangement shown in FIG. 3, to implement a similar unidirectional movement of the cam 7.

In either embodiment, the cam 7 is blocked from returning to its original position upon release of the braking operation, whereby the cam nut 3 is gradually rotated in a counter-clockwise direction as the pad 5 wears down, to thereby gradually move the push rod 2 to the right in FIG. 1 to compensate for the pad wear. As shown in FIG. 2, the cam nut 3, lever ring 21, roller 22 and spring 23 also constitute a free wheel. The wedging or jamming action is released, however, at the end of each braking operation by the clockwise rotation of the ring 21. In FIG. 3, on the other hand, the caliper 9 cannot rotate clockwise relative to the cam 7, and therefore only a one-way rotation of the cam 7 is possible-whenever the pad 5 wears down to the point where brake application causes the cam nut 3 and key 24 to rotate against the keyway 25 before the pad engages the disc.

The pad-wear compensating device according to the embodiment of FIGS. 1-7 is adjusted continuously rather than in an incremental or step-wise manner, as in the ratchet wheel embodiment of FIGS. 8-9. In the latter embodiment, the distance or spacing between adjacent ratchet wheel teeth should be less than the reserve or normal brake travel space 6 in the keyway 25. When the pads are replaced, the cap 16 is removed and the push rod 2 is rotated back to the left in FIG. 1, i.e. out to its original position.

What is claimed is:

1. In a disc brake assembly including a yoke member (9) arranged to straddle a brake disc (1), a brake pad (5) slidably mounted in the yoke member, an axially movable push rod (2) for urging the pad against the brake disc, a cam nut (3) threadingly engaging the push rod, and rotatable lever means (4, 21) engagable with the cam nut via a one-way clutch mechanism (20, 22, 23) for rotating the cam nut to thereby advance the push rod in the direction of the brake pad, a pad-wear compensating mechanism characterized by:
a cam member engaged with said cam nut to rotate therewith in the direction which moves said push rod towards said pad only after said cam member rotates through a preset angle, unidirectional means for preventing rotation of said cam member in the opposite direction, and the engagement between said cam member and said cam nut stopping the opposite direction rotation of said cam nut after rotation through said preset angle in said opposite direction.

2. A disc brake assembly as defined in claim 1 wherein said cam member surrounds at least a part of said cam nut and is rotationally engageable therewith by means of a key rotationally movable with said cam nut and a keyway in said cam member large enough to permit angular rotation of said cam nut through said present angle before engagement with said key.

3. A disc brake assembly as defined in claim 2, wherein the push rod is non-rotatable.

4. A disc brake assembly as claimed in claim 3, wherein the direction of rotation of the one-way clutch mechanism is the same as the unidirectional rotation allowed the cam member.

5. A disc brake assembly as defined in claim 2, wherein said unidirectional means comprises a plurality of spring biased jamming members disposed in wedge-shaped recesses in the cam member.

6. A disc brake assembly as defined in claim 2, wherein said unidirectional means comprises a ratchet and pawl mechanism.

7. A disc brake assembly as defined in claim 3, wherein the rotation of the push rod is prevented by cap means (16, 18) mounted to the yoke member and including a tongue (15) slidably engaged with a slot (14) in the push rod in a spline manner.

* * * * *